May 20, 1930.  S. RUMP  1,759,419
CONDENSER BUSHING
Filed March 2, 1926
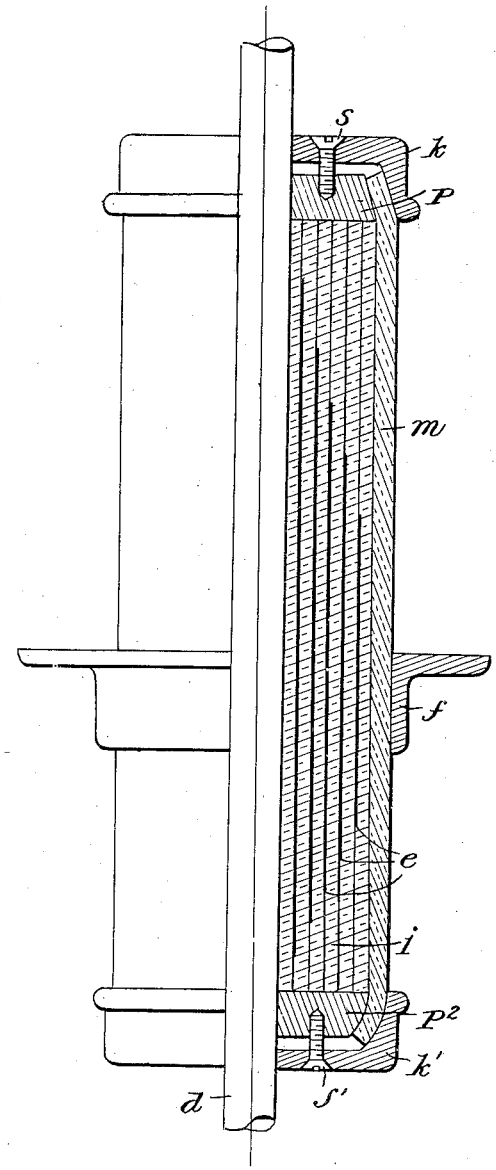
Witness:
Jas E Hutchinson
Inventor:
Sigurd Rump,
By
Attorneys.

Patented May 20, 1930

1,759,419

UNITED STATES PATENT OFFICE

SIGURD RUMP, OF BOSTON, MASSACHUSETTS, ASSIGNOR TO AMERICAN BROWN BOVERI ELECTRIC CORPORATION, OF NEW YORK, N. Y., A CORPORATION OF NEW YORK

CONDENSER BUSHING

Application filed March 2, 1926. Serial No. 91,767.

It is known to cover such parts of electric insulators of the condenser type as are exposed to exterior influences with weather proof insulation material, for instance, with porcelain. However, such insulators have been proved insufficient where the proper insulation body consists of a material of hygroscopic or oxidizable nature when used in damp rooms and outdoors where the moisture content of the air changes.

For manufacturing reasons condenser bushings must be made of a thin yielding material, preferably paper, but up to the present such bushings could only be used in rooms which are entirely dry and free from the influence of the weather.

According to this invention, the condenser bushings on the contrary can be used in an unlimited manner without this disadvantage. The condenser bushing is completely surrounded by an air and moisture proof insulating cover. In such a way it is possible to use, for the bushings themselves, dry or impregnated paper which is known as one of the best insulating materials which comes into consideration for this purpose.

The drawing shows a leading through bushing according to the invention. The paper and metal sheets which compose the insulating body $i$ are wound around the central conductor $d$. The whole insulator is surrounded by a protecting cover $m$ which is larger than the insulation body and which bears a flange $f$. This cover $m$ consists of an impervious insulation material which when used in closed rooms can be a tube of hard paper. The ends of the cylindrical body $i$ are covered with metal plates $p$ and $p^2$ which have exactly the same diameter as the insulation body $i$ and can be screwed on the conductor $d$ or can be soldered thereto.

Plate $p$ on the upper part of the insulator is shaped conically and plate $p^2$ on the lower part of the insulator is also conically shaped but curved. In this way the metal caps $k$ and $k^1$ can be tightly pressed on the rim of the plates $p$ and $p^2$ by means of screws $s$ and $s^1$ respectively.

The joints between tube $m$ and the metal parts $p$ and $k$ and $p^2$ and $k^1$ respectively can be filled in with a tightening mass, for instance, fat or lac.

The bushing is especially useful for apparatus which become heated during the working thereof, such as transformers, choke coils, etc. The clamp can be dipped in oil with its lower part which, as shown in the drawing, is of shorter length than the upper part. For use outdoors, the bushing can be provided with a porcelain cap in order to protect it against moisture. For cementing the porcelain cap on the insulator the upper cap $k$ receives a suitable form.

The insulator according to the invention allows high stresses and possesses practically unchangeable insulating qualities, so that its serviceability exceeds the known constructions.

I claim:

1. A terminal bushing comprising an insulating tube of hard gas-tight compressible material; enclosures for hermetically sealing the ends of said tube, said enclosures comprising a circular tapered member extending into the interior of the tube and a circular, similarly tapered cover member encircling said tube and adapted to be pressed thereagainst, means for tightening said members to said tube to form a hermetic junction therewith, and a condenser bushing body of alternate layers of insulating and conducting material within said tube.

2. A terminal insulating bushing comprising an electric current conductor, layers of insulating and of conducting material wound about said conductor, a tube of flexible insulating material enclosing said layers of material, metallic members within said tube, and metallic caps enclosing and clamping the ends of said tube against said metallic members.

3. A terminal insulating bushing comprising an electric current conductor, layers of insulating and of conducting material wound about said conductor, said insulating material being fibrous and hygroscopic, a tube of flexible insulating material enclosing said layers of material, metallic members within said tube, metallic caps enclosing and clamping the ends of said tube against said metallic members, and means for maintaining sealing engagement between said metallic members and said caps.

4. A terminal insulating bushing comprising an electric current conductor, layers of insulating and of conducting material wound about said conductor, a tube of flexible insulating material enclosing said layers of material, substantially conically shaped metallic members within said tube, metallic caps having conically shaped internal surfaces enclosing the ends of said tube, and screws joining said metallic members and said caps for clamping the ends of said tube therebetween.

In testimony whereof I hereunto sign my name.

SIGURD RUMP.